United States Patent
Bitterlich et al.

(10) Patent No.: US 10,695,991 B2
(45) Date of Patent: Jun. 30, 2020

(54) PROCESS ARRANGEMENT AND METHOD FOR PRODUCING A FIBER-REINFORCED PLASTIC COMPONENT

(71) Applicant: Volkswagen Aktiengesellschaft, Wolfsburg (DE)

(72) Inventors: Maurice Bitterlich, Lehre (DE); Max Ehleben, Braunschweig (DE); Katja Zeuner, Braunschweig (DE); Thomas Mertens, Ehra-Lessien (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 202 days.

(21) Appl. No.: 15/522,489

(22) PCT Filed: Sep. 23, 2015

(86) PCT No.: PCT/EP2015/071865
§ 371 (c)(1),
(2) Date: Apr. 27, 2017

(87) PCT Pub. No.: WO2016/082971
PCT Pub. Date: Jun. 2, 2016

(65) Prior Publication Data
US 2017/0326821 A1    Nov. 16, 2017

(30) Foreign Application Priority Data

Nov. 25, 2014   (DE) .................. 10 2014 223 982

(51) Int. Cl.
*B29C 70/54* (2006.01)
*B29C 70/50* (2006.01)
(Continued)

(52) U.S. Cl.
CPC .............. *B29C 70/54* (2013.01); *B29C 70/50* (2013.01); *B29K 2105/0872* (2013.01);
(Continued)

(58) Field of Classification Search
CPC .......... B29B 15/08–14; B29B 11/00–16; B29C 70/54
See application file for complete search history.

(56) References Cited

U.S. PATENT DOCUMENTS 4,029,461 A     6/1977  Lacon
4,944,671 A *   7/1990  Vohland ................ B29B 13/023
                                                              432/59
(Continued)

FOREIGN PATENT DOCUMENTS

CN    101282834 A    10/2008
CN    102192080 A    9/2011
(Continued)

OTHER PUBLICATIONS

Tolliver, D.L.. (1988). Handbook of Contamination Control in Microelectronics—Principles, Applications and Technology—14. 4.2 The SMIF System. (pp. 459-468). William Andrew Publishing/Noyes. Retrieved from https://app.knovel.com/hotlink/pdf/id:kt00653UN7/handbook-contamination/the-smif-system (Year: 1988).*

(Continued)

*Primary Examiner* — Matthew J Daniels
*Assistant Examiner* — Andrew L Swanson
(74) *Attorney, Agent, or Firm* — Pearl Cohen Zedek Latzer Baratz LLP

(57) ABSTRACT

A process arrangement for producing a fiber-reinforced plastic component comprises a stacking station in which pre-impregnated textile semi-finished products can be stacked, and an assembly station in which the semi-finished (Continued)

products can be further processed to form the layered packet. The forming of the fiber-reinforced plastic component is subsequently carried out in the press. According to the invention, the stacking station is assigned at least one transport and/or storage container in which the semi-finished products can be stored air-tight, light-proof, and/or moisture-tight shielding and can be transported to the assembly station.

15 Claims, 4 Drawing Sheets

(51) Int. Cl.
*B65D 85/62* (2006.01)
*B65D 83/08* (2006.01)
*B29K 105/08* (2006.01)

(52) U.S. Cl.
CPC .......... *B65D 83/08* (2013.01); *B65D 83/0805* (2013.01); *B65D 85/62* (2013.01)

(56) References Cited

U.S. PATENT DOCUMENTS

| | | | |
|---|---|---|---|
| 5,741,744 A * | 4/1998 | Fitchmun | B29C 70/086 442/16 |
| 2001/0015222 A1 | 8/2001 | Lewit et al. | |
| 2007/0093163 A1 | 4/2007 | Brown | |
| 2011/0215585 A1 | 9/2011 | Caires | |
| 2015/0292475 A1 | 10/2015 | Kannenberg | |

FOREIGN PATENT DOCUMENTS

| | | |
|---|---|---|
| CN | 20 2038577 U | 11/2011 |
| CN | 20 302 0803 U | 6/2013 |
| CN | 103522556 A | 1/2014 |
| CN | 103465436 B | 11/2015 |
| DE | 195 2375 U | 12/1966 |
| DE | 197 31 537 C1 | 10/1998 |
| DE | 199 26 477 A1 | 12/2000 |
| DE | 101 01 233 A1 | 7/2002 |
| DE | 102 165 18 A1 | 10/2003 |
| DE | 20 200 4006 159 U1 | 6/2004 |
| DE | 10 2005 059 627 B3 | 6/2007 |
| DE | 10 2012 220 937 A1 | 5/2014 |
| EP | 0352877 A1 | 1/1990 |
| EP | 0922727 A1 | 6/1999 |
| FR | 2 322 325 A1 | 3/1977 |
| GB | 2426736 A | 12/2006 |
| WO | WO 2012/ 116 947 A1 | 9/2012 |

OTHER PUBLICATIONS

Merriam-Webster Dictionary, vis-a-vis, 2012, Merriam-Webster, https://web.archive.org/web/20120512103135/https://www.merriam-webster.com/dictionary/vis-à-vis, (accessed May 16, 2019) (Year: 2012).*
Office Action for Chinese Patent Application No. 201580056395.X, dated Sep. 21, 2018.
Office Action for German Patent Application No. 10 2014 223 982.6, dated Jul. 8, 2015.
International Search Report of PCT Application No. PCT/EP2015/071865, dated Dec. 1, 2015.

* cited by examiner

PROCESS ARRANGEMENT AND METHOD FOR PRODUCING A FIBER-REINFORCED PLASTIC COMPONENT

CROSS-REFERENCE TO RELATED APPLICATIONS

This application is a National Phase Application of PCT International Application No. PCT/EP2015/071865, International Filing Date Sep. 23, 2015, claiming priority of German Patent Application No. 10 2014 223 982.6, filed Nov. 25, 2014, which is hereby incorporated by reference in its entirety.

FIELD OF THE INVENTION

The invention comprises a process arrangement for producing a fiber-reinforced plastic component as well as to a process for producing such a plastic component.

BACKGROUND OF THE INVENTION

Fiber-reinforced plastic components can be produced using textile semi-finished products, so-called prepregs. In the case of such prepregs, a textile fiber material is pre-impregnated with a thermoplastic matrix material below a polymerization starting temperature. In order to form the fiber-reinforced plastic component, the prepregs are stacked on top of each other in a laying process in order to form a layered packet and then subjected to a deep-drawing or compression procedure.

International patent application WO 2012/116947 A1 discloses a method of the generic type for producing prepregs, that is to say, fiber-reinforced flat semi-finished products with a polyamide matrix. With this method, first of all, textile structures are pre-impregnated with a liquid starting component of the polyamide matrix, that is to say, melted lactam, along with added catalysts and/or activators, and this is done in a continuous process. After the consolidation has been carried out, the pre-impregnated continuous textile structure is prepared in a cutting station to form fiber-reinforced flat semi-finished products which are stacked on top of each other in a stacking station. During the further processing sequence, the pre-impregnated textile semi-finished products are transported to an assembly station where the textile semi-finished products are stacked on top of each other in a laying process and cut to size according to the final contour of the component that is to be produced. The layered packet thus formed is subsequently placed into a mold. This is followed by the forming step, which is done at a temperature above the polymerization starting temperature in a compression or deep-drawing procedure. In this manner, the pre-impregnated lactam polymerizes to form a polyamide. The simultaneous deep drawing and compression impart the fiber-reinforced flat semi-finished product with the desired shape of the component that is to be produced.

The problem encountered in the process chain described above is that, in the pre-impregnated textile semi-finished products, the starting component of the thermoplastic matrix, which has not yet polymerized, reacts upon coming into contact with the environment, that is to say, with the humidity, the oxygen, the UV light or the like, as a result of which its processability, especially its polymerization, is impaired over the course of the further processing. In order to reduce such a detrimental reaction with the environment, in the state of the art, the pre-impregnated textile semi-finished products are dried in an energy-intensive manner during their storage and transport until they are processed.

SUMMARY OF THE INVENTION

The objective of the invention is to put forward a method for producing a fiber-reinforced plastic component in which pre-impregnated textile semi-finished products can be stored and transported in a simple manner, without detrimentally affecting their processability.

This objective is achieved by the features of the independent claims. Preferred refinements of the invention are disclosed in the subordinate claims.

According to the characterizing part of claim 1, the stacking station is associated with at least one transport and/or storage container in which the prepared, pre-impregnated textile semi-finished products can be stored while being shielded in a manner that is air-proof, light-proof and/or moisture-proof, and can be transported to the assembly station. This ensures that the process steps that are carried out after the production of the prepregs are carried out while avoiding, for example, an impermissible absorption of moisture. Here, an automatic stacking and removal of the prepreg material is made possible. As explained above, the concept according to the invention comprises a container system consisting of at least one transport and/or storage container. The first steps of the process chain, that is to say, the production and stacking of the pre-impregnated textile semi-finished products, are carried out as indicated in the above-mentioned state of the art according to international patent application WO 2012/116947 A1. The optionally automated loading of the transport and/or storage container can be carried out directly in the prepreg installation.

The at least one transport and/or storage container can preferably be configured in two parts, namely, with a lower housing section on which the semi-finished products can be stacked, and with an upper housing section that is detachably mounted onto the lower housing section. With any eye towards avoiding an erroneous placement of the pre-impregnated textile semi-finished products, the top of the container can be a hood (like a butter dish) that can be removed from the bottom of the container. Consequently, once the container hood has been taken off, there are no more interfering edges on the container when the pre-impregnated textile semi-finished products are being put in place or removed, since the bottom of the container is open along the circumference, that is to say, configured rim-free without upright side walls that could otherwise constitute an interfering contour.

In the process arrangement according to the invention, a climate that is precisely coordinated with the process is maintained during the entire production and loading process. An important parameter in this context is the humidity. The transport and/or storage container according to the invention ensures that the produced pre-impregnated textile semi-finished products are protected against moisture at all times.

After the loading procedure has been completed, for example, using a scissor lift table, the bottom of the container (by way of example) is docked onto the container hood. As an alternative, the bottom of the container can remain stationary and the container hood can be lowered onto it. The container can be sealed, for instance, by means of an encircling round gasket cord in the bottom of the container. Quick-release clamps can provide a continuous and uniform contact pressure of the cover onto the gasket. If the prepreg material is stored for an extended period of time, the next process step can be to flood the loaded closed container with an inert gas, for example, nitrogen. In this manner, the residual moisture in the container can be minimized and the processability of the prepreg can be greatly prolonged. The container is flooded, for example, via an $N_2$ quick-release coupling. In this process, the air that is present in the container is replaced by extremely dry inert gas. A safety valve, preferably on a wall opposite from the quick-release coupling, can be provided in order to avoid an excessive pressure in the interior of the container.

The further processing of the prepreg material can be carried out in the above-mentioned assembly station, which is preferably configured as a likewise climate-controlled space that is shielded against external influences.

The invention can be used for all reinforced and/or even non-reinforced materials that are sensitive to environmental influences. The shielding against humidity, oxygen, UV radiation, etc. can be necessary for such materials in order to retain their processability. As compared to the above-mentioned state of the art, this entails the following briefly elaborated advantages: for instance, the invention can be used for an automated placement of pre-impregnated textile semi-finished products (that is to say, prepregs). Moreover, the prepregs can be automatically shielded air-tight in a prepreg container and consequently, a prolonged processability of the prepreg material can be achieved. Moreover, the flooding/flushing of the prepreg container, preferably with dry air/nitrogen/argon, can provide additional protection against moisture and/or oxygen. The prepreg container can also be fitted with a pressure relief valve, thereby preventing excessive internal pressure and rupturing of the container. Moreover, the transport and/or storage containers permit an automated or partially automated transport as well as secure storage of the prepreg. Furthermore, a secure stacking of the prepreg container and thus a space-saving concept can be provided.

Additional aspects of the invention will be described below: thus, the assembly station can additionally have at least one docking site where the pre-impregnated textile semi-finished products can be transferred to the outside and into the assembly station while being shielded. For this purpose, in a first variant, the docking site can have a lock chamber in which the transport and/or storage container is positioned and subsequently the pre-impregnated textile semi-finished products are removed for further processing. In this variant, however, a space can be provided for the lock chamber, which is ventilated with climate-controlled air, and this calls for extensive resources in terms of processing technology.

As an alternative, the docking site can preferably have a closable access opening that is configured in a housing that delimits the processing space of the assembly station. By the same token, the transport and/or storage container can also be configured with a closable removal opening. When the pre-impregnated textile semi-finished products are transferred, the removal opening of the container and the access opening of the assembly station are coupled to each other and opened in a manner that is air-proof, light-proof and/or moisture-proof. Subsequently, the pre-impregnated textile semi-finished products are transferred either automatically or manually out of the transport and/or storage container directly into the processing space of the assembly station.

The removal opening of the container and/or the access opening of the housing can preferably have a passage slit which is widened in the crosswise direction and through which the semi-finished products can be transferred into the processing space of the assembly station. The crosswise passage slit can be adjoined by at least one access slit which is configured to be upright and elongated, and which facilitates access to the topmost semi-finished product in at least one semi-finished product stack of the container.

In a preferred embodiment, the removal opening of the container and/or the access opening of the housing is configured to be approximately T-shaped. This means that the crosswise passage slit makes a transition approximately in the middle to an upright and elongated access slit. As an alternative, however, other cross sectional shapes are also conceivable. For example, the two ends of the passage slit that are opposite from each other in the crosswise direction each make a transition to an access slit on the side. In addition to this, if desired, a third access slit can also be provided in the middle.

In order to technically implement such a docking procedure, the transport and/or storage container can first be positioned on a frame with a rail system. In this process, conical positioning elements can serve for the precise orientation of the container. Subsequently, the container is pushed in the direction of the housing of the assembly station until it comes to rest flush against a sealing flange that is situated between the container and the housing of the assembly station, and it is held in place by means of quick-release clamps. In this state, the assembly station and the transport and/or storage container are coupled to each so as to be air-tight. Subsequently, the container is opened, preferably from inside the assembly station. Preferably, the cover of the container, which is attached air-tight to the side of the container, is geometrically adapted in such a way that it can be dismantled through the sealing flange in the interior of the assembly station. If applicable, the side cover can be opened by means of a hinge system.

The advantageous embodiments and/or refinements of the invention explained above and/or presented in the subordinate claims can be used individually or else in any combination with each other, aside from, for example, the cases involving unambiguous dependencies or incompatible alternatives.

BRIEF DESCRIPTION OF THE DRAWINGS

The invention and its advantageous embodiments and refinements as well as their advantages will be explained in greater detail below on the basis of drawings.

The following is shown.

DETAILED DESCRIPTION OF THE INVENTION

Figure 1:
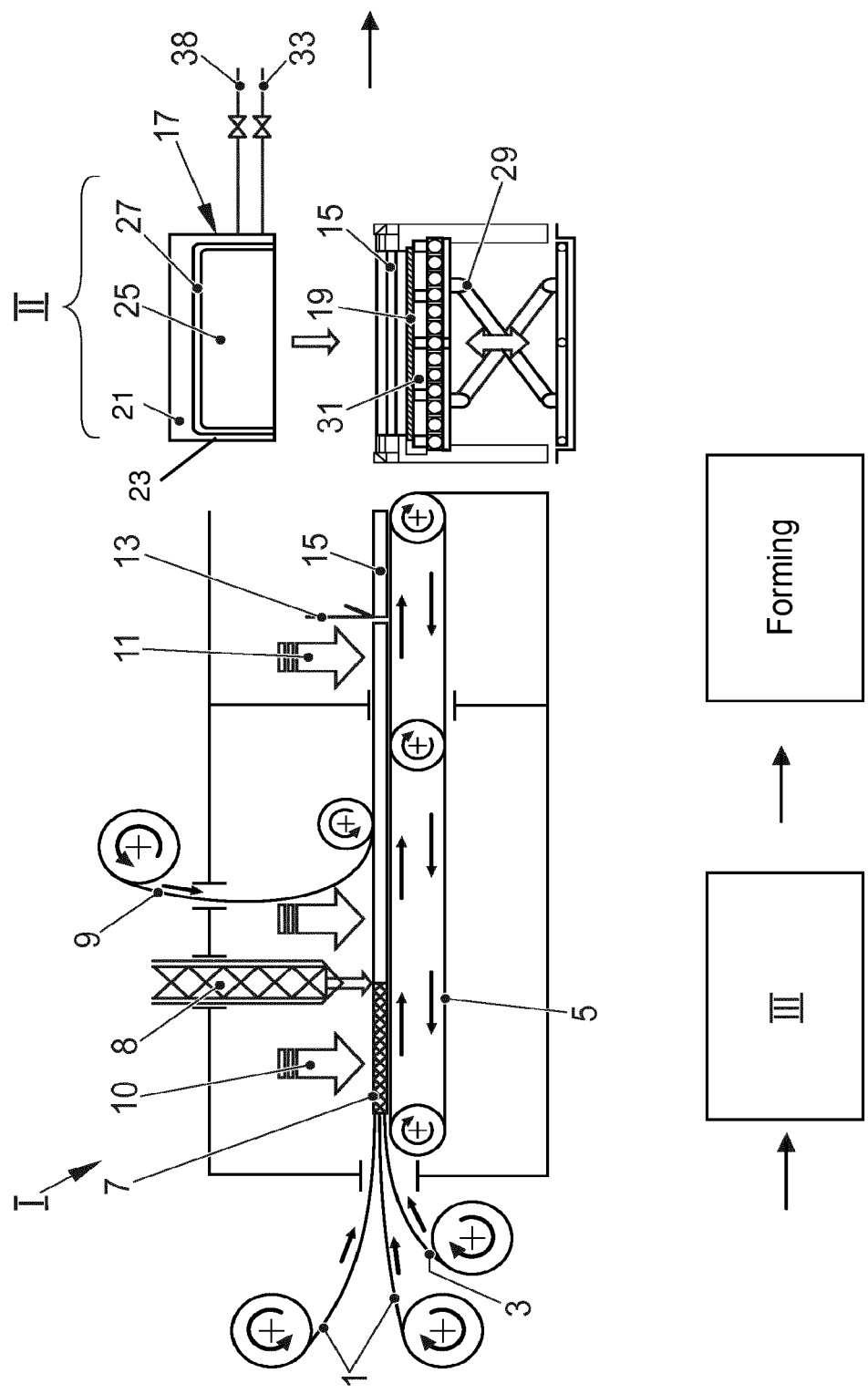
FIG. 1 a block diagram to illustrate process steps for producing the fiber-reinforced plastic component.

On the basis of FIG. 1, a method for producing a fiber-reinforced plastic component is shown to the extent that this is necessary to understand the invention. Accordingly, for example, first of all, two fiber layers 1 are placed onto a continuous conveyor belt 5 in a continuous process in a production station I, while a first film 3 made, for instance, of polyamide or another suitable material, is placed between these layers. The textile layered structure 7 thus formed is impregnated with a starting component 8 of a thermoplastic matrix material such as lactam, and this is done under exposure to heat 10 at a temperature below the starting temperature for the polymerization of the starting component of the thermoplastic material.

Subsequently, during the further processing sequence, a second film 9 is applied and the textile layered structure 7 is cooled off in a cooling unit 11 and prepared in a subsequent cutting unit 13 to form individual pre-impregnated textile semi-finished products 15.

The pre-impregnated textile semi-finished products 15 are stacked on top of each other in a subsequent stacking station II. For this purpose, the stacking station II has a transport and/or storage container 17 that is configured in two-parts in FIG. 1. As can be seen in FIG. 1, the transport and/or storage container 17 is shown in the open position, namely, with a housing bottom 19 that is open along the circumference, that is to say, rim-free without an upright side wall, and with an upper housing hood 21 having a top cover wall as well as encircling side walls 23. In the side wall 23 shown in FIG. 1, there is a removal opening 27 which is closed off by a side cover 25 and whose function will be described below. As shown in FIG. 1, the container 17 has been placed on a height-adjustable scissor lift table 29. The underside of the container bottom 19 (that is to say, the baseplate of the container) has forklift pockets 31 in order to facilitate the transport of the container.

In terms of the process sequence, the stacking station II is followed by an assembly station III in which the pre-impregnated textile semi-finished products 15 (below also referred to as prepregs) are cut to size and stacked on top of each other as a layered packet 16 (FIG. 2) in order to prepare for a subsequent deep-drawing and/or compression procedure. During the deep-drawing and/or compression procedure, the layered packet 16 is heated to a temperature above the polymerization starting temperature, which is done with the simultaneous compression and/or deep-drawing of the layered packet 16 into the shape of the fiber-reinforced plastic component that is to be produced.

The transport and/or storage process between the stacking station II and the assembly station III is described in greater detail below: after the container 17 is loaded with the fiber semi-finished products 15, its housing bottom 19 is raised by means of a scissor lift table and docked onto the housing hood 21. As a result, the fiber semi-finished products 15 stored in the container are shielded vis-à-vis the outside in a manner that is air-proof, light-proof and moisture-proof.

Figure 2:
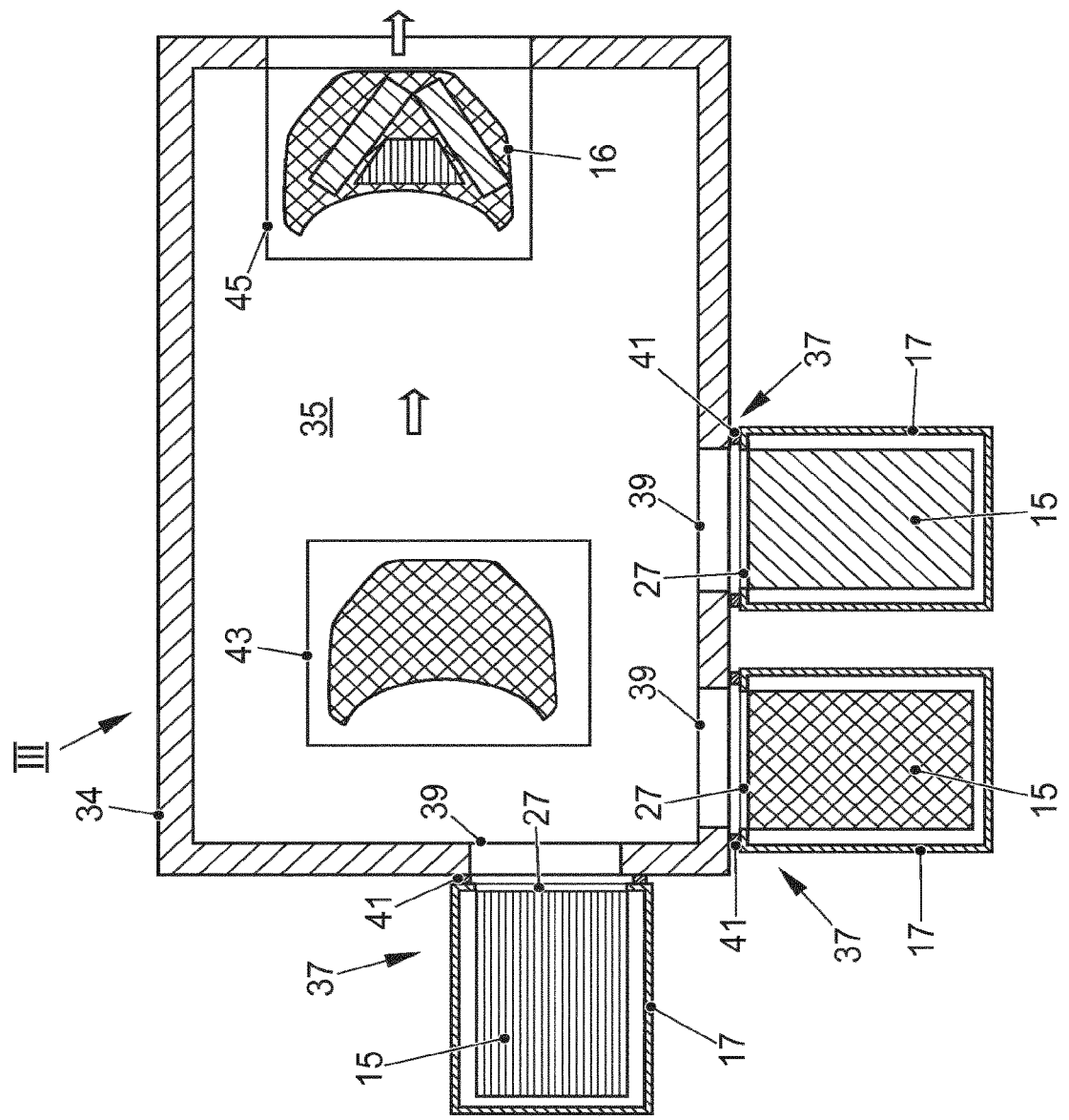
FIG. 2 a depiction of the principle of an assembly station with a processing space in a top view.

In FIG. 1, the container 17 has an inert gas connection 33 by means of which the interior of the container can be conditioned with dry air and/or an inert gas such as, for example, nitrogen or argon. Moreover, the container 17 has, for example, another connection 38 for a safety valve. In a container 17 that has been conditioned in this manner, the prepregs 15 can be stored for an extended period of time without this impairing their further processing, and they can subsequently be transported to the assembly station III, whose structure is shown roughly in FIG. 2. Accordingly, the assembly station III has a housing 34 delimiting a processing space 35 that is conditioned with dry air and that is shielded vis-à-vis the outside against detrimental environmental influences. In FIG. 2, the assembly station III has a total of, for example, three docking sites 37 on the outside of its housing 37. A container 17 loaded with pre-impregnated textile semi-finished products 15 is positioned at each of the docking sites 37. The semi-finished products 15 contained in each container 17 each have different fiber orientations and/or a different fiber structure and/or different fiber material, as is indicated in the sectional top view of FIG. 2 by the cross-hatching, the horizontal hatching, and the diagonal hatching of the semi-finished products 15.

In this context, the removal opening 27 of each of the containers 17 is placed congruently with a corresponding access opening 39 that is formed in the housing 34 of the assembly station III. In FIG. 2, the three containers 17 are in contact with the housing 34, with a sealing flange 41 (FIGS. 2 to 4) between them. The sealing flange 41 surrounds the access and removal openings 27, 39 in an air-tight manner. The side cover 25 that closes off the removal opening 27 of each container 17 is constructed in such a way that it can be opened from the processing space 35 by an operator (or as an alternative, automatically) after the docking process of the container 17 has been completed. FIG. 5 shows a view from inside the assembly station III, namely, in the viewing direction of the operator towards the opened access and removal openings 27, 39. In this manner, the operator, who is in the processing space 35, has direct access to the fiber semi-finished products 15 contained in the docked containers 17. The fiber semi-finished products 15 can thus be removed in such a way that they are protected against external environmental influences and they can be automatically or manually cut to size on a cutting table 43 in the processing space 35.

Subsequently, the fiber semi-finished products 15 that have been cut to size are stacked on top of each other on a work table 45, either loosely or optionally with a binder between them, in order to form a layered packet 16. The layered packet 16 is subsequently pushed (transported) out of the assembly station III through a flap that can be opened towards the outside via a drawer that is mounted on a rail system, and it can then be placed into a mold in which a deep-drawing or compression procedure is carried out in order to produce the plastic component.

Figure 4:
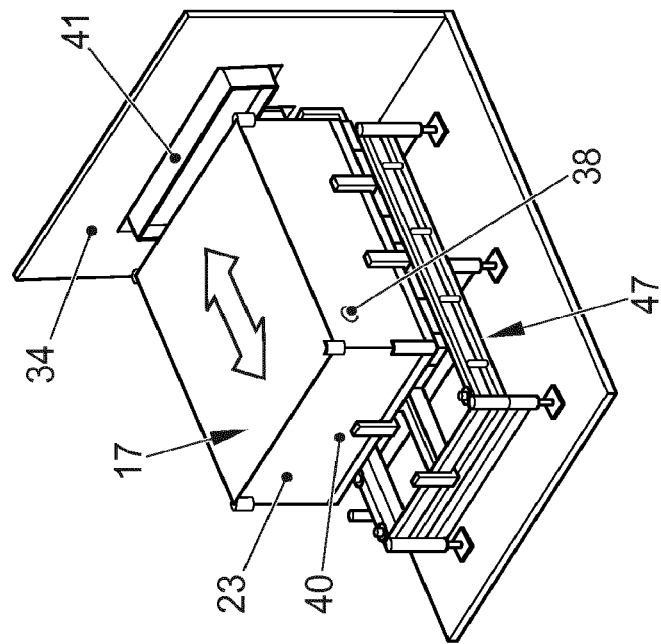
FIGS. 3 and 4 a docking station of the assembly station with as well as without a storage and/or transport container.
Figure 3:
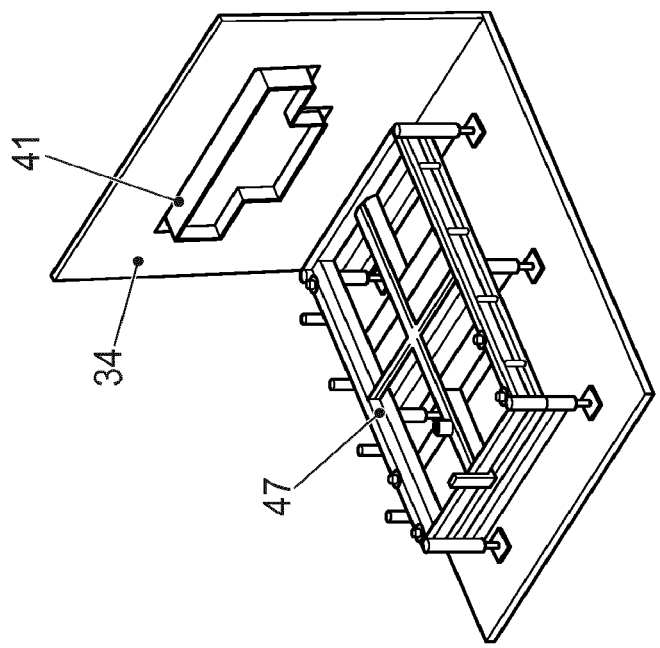
Figure 5:
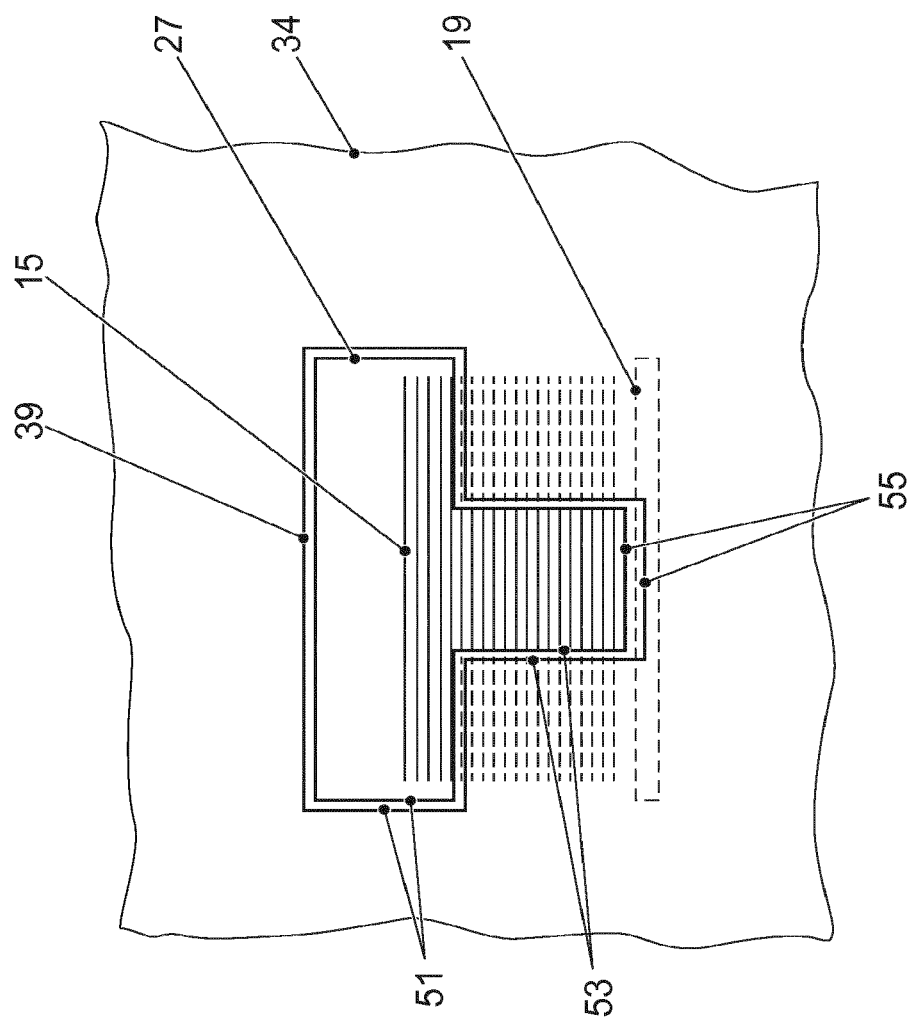
FIG. 5 a view from inside the assembly station of an access opening configured in the housing.

One of the docking sites 37 of the assembly station III is shown in a roughly simplified depiction in FIGS. 3 and 4. Accordingly, the docking site 37 has a frame 47 with a rail system on which the container 17 is movably positioned. The container 17 positioned here can be pushed in the direction of the housing 34 until it comes to rest flush against the sealing flange 41 and is held in place by means of quick-release clamps 40 (FIG. 4). Subsequently, the side cover 25 of the container 17 can be opened from the inside of the assembly station III.

As can also be seen in FIGS. 3 to 5, the removal opening 27 of the container as well as the access opening 39 of the housing 34 have a special, approximately T-shaped opening cross section. The latter is formed by a passage slit 51 which is widened in the crosswise direction and through which the semi-finished products 15 can be transferred, and it is followed by an access slit 53 which is configured to be upright and elongated, and through which access to the topmost semi-finished product 15 in the semi-finished product stack of the container 17 is made possible. In FIG. 5, the lower edge 55 of the access slit 53 is at approximately the same height as the container bottom 19, as a result of which the height to which the semi-finished products 15 have been stacked in the container 17 can easily be seen.

The invention claimed is:

1. A process arrangement for producing a fiber-reinforced plastic component, comprising:
    a stacking station in which pre-impregnated textile semi-finished products can be stacked, and
    an assembly station in which the semi-finished products can be further processed to form a layered packet
        wherein the stacking station is associated with at least one transport and/or storage container in which the semi-finished products can be stored while being shielded in a manner that is air-tight, light-proof and/or moisture-proof and can be transported to the assembly station;

wherein the transport and/or storage container is configured in two parts, with a lower housing section on which the semi-finished products are stacked, and with an upper housing section that is detachably held on the lower housing section; and wherein the lower housing section is a housing bottom that is open along a circumference thereof and is configured rim-free without an upright side wall that could otherwise constitute an interfering contour.

2. The process arrangement according to claim 1, wherein the upper housing part is a housing hood having a top cover wall as well as encircling side walls.

3. The process arrangement according to claim 1, wherein the transport and/or storage container has an inert gas connection by means of which an interior of the container can be conditioned with dry air and/or an inert gas.

4. The process arrangement according to claim 1,
wherein the assembly station has a processing space that is shielded from an outside of the processing space and that is conditioned with dry air, and
wherein the assembly station has at least one docking site where the semi-finished products can be transferred to the outside and into the assembly station while being shielded.

5. The process arrangement according to claim 4,
wherein the processing space of the assembly station is delimited by a housing in which the at least one closable access opening is configured, and
wherein the semi-finished products can be transferred from the transport and/or storage container into the processing space of the assembly station via the access opening.

6. The process arrangement according to claim 5,
wherein a closable removal opening is configured in the housing of the transport and/or storage container,
wherein, during the transfer procedure, the removal opening of the transport and/or storage container and the access opening of the assembly station are coupled to each other in a manner that is air-tight, light-proof and/or moisture-proof.

7. The process arrangement according to claim 6,
wherein the transport and/or storage container is in contact with an edge area of the access opening of the assembly station with a sealing element between them, and
wherein the sealing element surrounds the access and removal openings like a frame.

8. The process arrangement according to claim 6, wherein the docking site of the assembly station has a frame on which the transport and/or storage container can be positioned in a position in which the removal opening of the container and the access opening of the assembly station are coordinated with each other.

9. The process arrangement according to claim 6, wherein the removal opening of the container and/or the access opening of the housing have a passage slit which is widened especially in the crosswise direction, and through which the semi-finished products can be passed, and at least one access slit adjoining it, which has an upright elongated configuration and through which access is made possible to a topmost semi-finished product in the semi-finished product stack of the container.

10. The process arrangement according to claim 9,
wherein the removal opening of the container and/or the access opening of the housing have an approximately T-shaped configuration, and/or
wherein a lower edge of the access slit is at approximately a same height as the container bottom, as a result of which the height to which the semi-finished products have been stacked in the container can easily be seen.

11. The process arrangement according to claim 9, wherein, inside the container, there is a lifting unit by which the semi-finished products that are stacked on top of each other can be conveyed further, so that the topmost semi-finished product is arranged at the height of the passage slit.

12. The process arrangement according to claim 2, wherein:
the assembly station has a processing space that is shielded from an outside of the processing space and that is conditioned with dry air;
the processing space of the assembly station is delimited by a housing in which the at least one closable access opening is configured;
a closable removal opening is configured in the housing of the transport and/or storage container; and
the removal opening is configured in a side wall of the housing hood of the transport and/or storage container.

13. The process arrangement according to claim 1, wherein, in terms of the process sequence, the stacking station is downstream from a production station in which the textile semi-finished products that have been pre-impregnated with the thermoplastic matrix material can be produced and cut to size.

14. The process arrangement according to claim 1, wherein the pre-impregnated textile semi-finished products are stacked at the stacking station and transported to the assembly station for purposes of further processing while being shielded in a manner that is air-tight, light-proof and/or moisture-proof.

15. A process arrangement for producing a fiber-reinforced plastic component, comprising:
a stacking station in which pre-impregnated textile semi-finished products can be stacked, and
an assembly station in which the semi-finished products can be further processed to form a layered packet, wherein the assembly station has:
a processing space that is shielded from an outside of the processing space and that is conditioned with dry air, and
at least one docking site where the semi-finished products can be transferred to the outside and into the assembly station while being shielded,
wherein:
the stacking station is associated with at least one transport and/or storage container in which the semi-finished products can be stored while being shielded in a manner that is air-tight, light-proof and/or moisture-proof and can be transported to the assembly station,
the processing space of the assembly station is delimited by a housing in which the at least one closable access opening is configured,
a closable removal opening is configured in the housing of the transport and/or storage container,
the semi-finished products can be transferred from the transport and/or storage container into the processing space of the assembly station via the access opening,
during the transfer procedure, the removal opening of the transport and/or storage container and the access opening of the assembly station are coupled to each other in a manner that is air-tight, light-proof and/or moisture-proof, and the removal opening of the container and/or the access opening of the housing have a passage slit which is widened especially in the crosswise direction, and through which the semi-finished products can be passed, and at least one access slit adjoining it, which has an upright elongated configuration and through which access is made possible to a topmost semi-finished product in the semi-finished product stack of the container.

\* \* \* \* \*